United States Patent
Rothamel (10) Patent No.: US 6,871,543 B2
(45) Date of Patent: Mar. 29, 2005

(54) APPARATUS AND METHOD FOR MEASURING OF ANY IMBALANCE OF A MOTORCYCLE WHEEL

(75) Inventor: Karl Rothamel, Ober-Ramstadt (DE)

(73) Assignee: Snap-on Equipment GmbH (DE)

(*) Notice: Subject to any disclaimer, the term of this patent is extended or adjusted under 35 U.S.C. 154(b) by 0 days.

(21) Appl. No.: 10/351,654

(22) Filed: Jan. 24, 2003

(65) Prior Publication Data

US 2004/0003661 A1 Jan. 8, 2004

(30) Foreign Application Priority Data

Jan. 25, 2002 (DE) .......................................... 102 02 897

(51) Int. Cl.[7] .................................................. G01M 1/16
(52) U.S. Cl. .............................. 73/462; 73/460; 73/475; 73/487
(58) Field of Search ........................ 73/460, 462, 471, 73/475, 487, 1.14; 700/279

(56) References Cited

U.S. PATENT DOCUMENTS

| | | | | |
|---|---|---|---|---|
| 3,036,467 A | * | 5/1962 | McWhorter | 73/459 |
| 4,191,055 A | * | 3/1980 | Orem et al. | 73/462 |
| 4,254,658 A | * | 3/1981 | Kogler et al. | 73/462 |
| 4,262,536 A | * | 4/1981 | Orem et al. | 73/462 |
| 4,489,608 A | * | 12/1984 | Borner | 73/487 |
| 4,972,712 A | | 11/1990 | Monch | 73/462 |
| 5,060,513 A | * | 10/1991 | Rothamel | 73/460 |
| 5,355,728 A | * | 10/1994 | Hartmann, Jr. | 73/460 |
| 5,469,040 A | * | 11/1995 | Rothamel | 318/785 |
| 5,773,719 A | * | 6/1998 | Ferrari et al. | 73/487 |
| 6,430,992 B1 | * | 8/2002 | Goebel | 73/66 |
| 2002/0026829 A1 | * | 3/2002 | Corghi | 73/487 |
| 2003/0101813 A1 | * | 6/2003 | Rothamel et al. | 73/487 |

FOREIGN PATENT DOCUMENTS

| | | |
|---|---|---|
| CA | 2201225 | 3/1997 |
| DE | 3923191 | 1/1991 |
| DE | 39 43 046 A1 | 7/1991 |
| EP | 0 806 645 A2 | 11/1997 |

OTHER PUBLICATIONS

Company prospectus from Hoffmann Werkstatt–Technik GmbH, 64311 Pfungstadt, Germany, Sep., 1998.

* cited by examiner

Primary Examiner—Hezron Williams
Assistant Examiner—John C Hanley
(74) Attorney, Agent, or Firm—Ostrolenk, Faber, Gerb & Soffen, LLP

(57) ABSTRACT

Apparatus and method for measurement of any unbalance of a motorcycle wheel, having a rotatable main shaft of a wheel balancing machine having an electrical drive, a clamping shaft fixed coaxially with the main shaft and on which the motorcycle wheel is rotatably mounted on its bearings, a driver device which is connected in a non-rotational manner to the main shaft to transmit a torque, produced by the electrical drive, from the main shaft to the motorcycle wheel which is rotatably mounted on the clamping shaft, and a measurement device which, in one measurement run, measures forces from any imbalance of the motorcycle wheel at the measurement rotation speed, where the non-rotational connection between the driver device and the motorcycle wheel can be detached by means of an inertial force, which acts on the driver device and is formed by a torque impulse that is transmitted via the main shall.

42 Claims, 8 Drawing Sheets

APPARATUS AND METHOD FOR MEASURING OF ANY IMBALANCE OF A MOTORCYCLE WHEEL

BACKGROUND OF THE INVENTION

1. Field of the Invention

The invention relates to an apparatus for measuring any imbalance of a motorcycle wheel, and to a method for measurement of such imbalance.

2. Related Art

An apparatus such as this and a method such as this are known from DE 39 43 046 A1, with a driver device, which engages in the spokes of the motor cycle wheel, being provided in order to produce a rotationally fixed connection between a main shaft of a wheel balancing machine and the motor cycle wheel which is to be balanced. Furthermore, a driver apparatus which has drivers which can be pressed against the tire running surface of the motor cycle wheel is known under the name "geodyna 1100/2100/2501" from the company prospectus from Hoffmann Werkstatt-Technik GmbH, DE-64311 Pfungstadt.

During an unbalance measurement run, in which the motor cycle wheel is driven by a torque which is produced by an electrical drive on the main shaft, the motor cycle wheel rotates in its own bearings on a clamping shaft which is connected to the driver device.

In the known apparatuses, there is a risk of the measurement result being influenced by the driver device which also rotates during the unbalance measurement run.

BRIEF SUMMARY OF THE INVENTION

The object of the invention is thus to achieve a measurement run which is not influenced by the driver device for the apparatus mentioned initially and the method mentioned initially with little complexity, that is to say as far as possible without any major additional design complexity.

These objects are achieved according to the invention disclosed and claimed herein.

In the invention, the rotationally fixed connection between the driver device and the motor cycle wheel can be detached by means of an inertia force which acts on the driver device and is formed by a torque impulse that is transmitted via the main shaft. The rotationally fixed connection is preferably detached at the measurement rotation speed. The motor cycle wheel can then rotate freely on the clamping shaft in its own bearings without being influenced by the drive device, and forces which result from any wheel unbalance are detected without any external influences by the measurement device of the balancing machine.

After the measurement run, the motor cycle wheel is braked and may be brought to the unbalance compensation angle position by means of a conventional braking device, which may also be an additional braking device provided on the balancing machine.

If the braking process is carried out by the electrical drive of the main shaft, it is advantageous to use a further torque impulse to produce an inertia force by means of which the driver device is once again connected in a rotationally fixed manner to the motor cycle wheel. The main shaft, by means of which the driver device is connected in a rotationally fixed manner by means of a detachable connection, is preferably taken to the same rotation speed as that of the motor cycle wheel after the measurement run has been carried out, with the torque impulse and the inertia force which result from it being produced at this rotation speed, connecting the driver device to the rotating wheel.

The inertia force can be produced by an inert mass which rotates with the main shaft and on which the torque impulse acts. The inert mass is preferably arranged such that it can move with respect to the components by means of which the rotationally fixed connection between the main shaft and the motor cycle wheel is maintained, with the movement distance preferably being limited. The movement of the inert mass which is produced by the torque impulse preferably takes place against a restoring force, in particular against the force of a restoring spring.

In one preferred exemplary embodiment, the inert mass is mounted on the driver device such that it can move.

The inert mass is preferably mounted such that it can move in one of the two rotation directions of the main shaft. The torque impulse may be produced by the electrical drive which drives the main shaft of the balancing machine. The torque impulse results in a brief change in the torque which is produced by the electrical drive and is transmitted to the main shaft of the balancing machine. This may be a brief torque increase or a brief torque reduction.

The driver device has one or more driver brackets which can be pressed with a specific driver force against the tire running surface of the motor cycle wheel. A driver device is preferably used in which a single driver bracket is pressed against the tire running surface of the motor cycle wheel. The driver bracket is preferably mounted such that it can pivot about a pivoting journal which is essentially parallel to the axis of the main shaft of the balancing machine. In this case, the driver bracket can preferably assume three positions, with a first position being assumed during acceleration to the measurement rotation speed, at which the driver bracket is pressed with a specific driver force against the tire running surface of the motor cycle wheel in order to produce the rotationally fixed connection. The driver force may be formed by hand by the person carrying out the servicing work during fitment of the driver bracket, or by a spring force which acts in the radial direction with respect to the main shaft axis. In a second position, the driver bracket is held in a position where it is detached from the motor cycle wheel. The driver bracket assumes this second position when, owing to the inertia force produced by the torque impulse, the driver bracket has been released from the first position and has been moved to the second position by a movement force which is preferably produced by a driver spring. In the third position, the driver bracket is once again pressed against the running surface of the motor cycle wheel by the force of the driver spring. The driver bracket is released from the preferably latched second position by the inertia force which is produced by the second torque impulse. The driver bracket is moved from the second position to the third position by the force of the driver spring, which presses the driver bracket against the tire running surface of the motor cycle wheel.

The driver spring, which can also produce part of the driver force, in the preferred exemplary embodiment causes the driver bracket to pivot about its pivoting journal while changing between the successive three positions, with the driver bracket being fixed in at least the first position and the second position by a latching device, whose latching positions are released by the inertia force produced by the torque impulse. However, the driver bracket can also be pivoted by an additional force store, for example a spring.

The torque which is produced by the electrical drive can be transmitted to the main shaft of the wheel balancing machine by means of a belt drive. A gearwheel transmission may also be used, via which the torque which is produced by the electrical drive is transmitted to the main shaft. The gearwheels of the gearwheel transmission may have a helical tooth system. The maintenance of a continuous power drive via the gearwheels results in brief rotation speed changes in order to produce the torque impulse being transmitted without any delay to the main shaft, and hence to the inert mass, which is connected in a rotationally fixed manner to the main shaft, in order to operate the driver device. Since the measurement rotation speed may be below the synchronous rotation speed when using an asynchronous motor, in particular a single-phase asynchronous motor, a forward-driving torque is always transmitted to the main shaft via the gearwheel transmission.

An electrical drive which is in the form of an AC motor, in particular an asynchronous motor, is used for the invention. Its power supply circuit preferably has an AC voltage controller which is controlled by pulse-width modulation. The AC voltage controller has a series switch and a commutation switch, which are controlled by the pulse-width modulation, with both the series switch and the commutation switch being formed by in each case two back-to-back series-connected semiconductor switches. This allows brief torque changes (torque impulses) to be created, which produce the inertia forces that are required to operate the driver device.

BRIEF DESCRIPTION OF THE DRAWINGS

The invention will be explained in more detail using exemplary embodiments and with reference to the figures, in which.

DETAILED DESCRIPTION OF AN EMBODIMENT OF THE INVENTION

Figure 8:
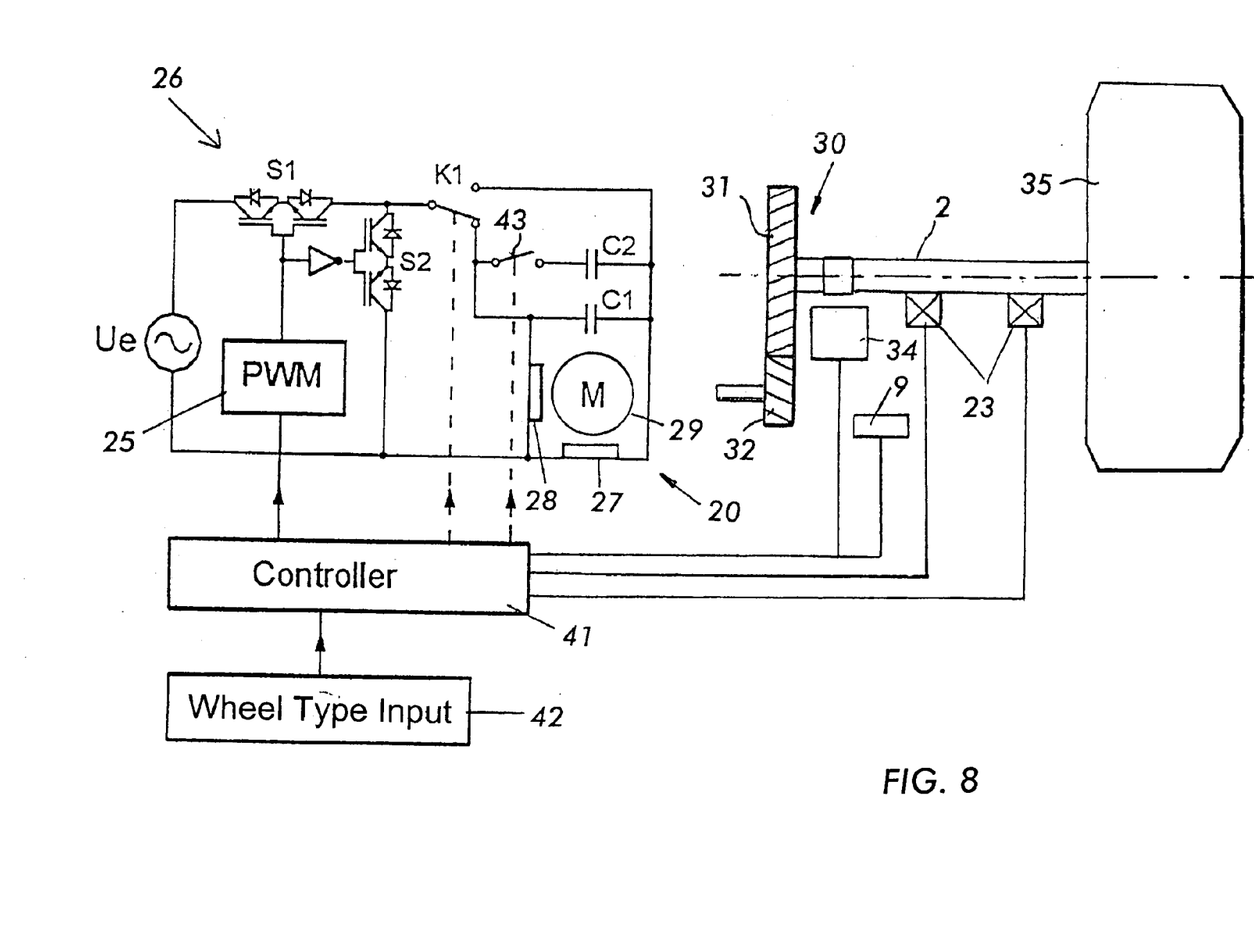
FIG. 8 shows an electrical drive for the main shaft of the wheel balancing machine used in the exemplary embodiment.

The figures show a wheel balancing machine, by means of which vehicle wheels of any type, in particular motor vehicle wheels and motor cycle wheels, can be balanced. The wheel balancing machine has a main shaft 2, which is mounted in a bearing device 33 on the machine housing 1. The bearing device 33 may contain the measurement arrangement as well as measurement transducers, in particular force measurement transducers for a measurement device 23 (FIG. 8). A bearing device such as this is known from DE 198 44 975 C2.

The main shaft 2 is driven by an electrical drive 20 which has an electric motor 29 and will be explained in more detail with reference to FIG. 8. To do this, the electrical drive 20 produces a torque which is transmitted via the main shaft 2 to the motor vehicle wheel 35 (FIG. 8) that is to be balanced, or to the motor cycle wheel 4 (FIGS. 1 and 2), which is connected in a rotationally fixed manner to the main shaft 2 by means of a driver device 22.

Figure 1:
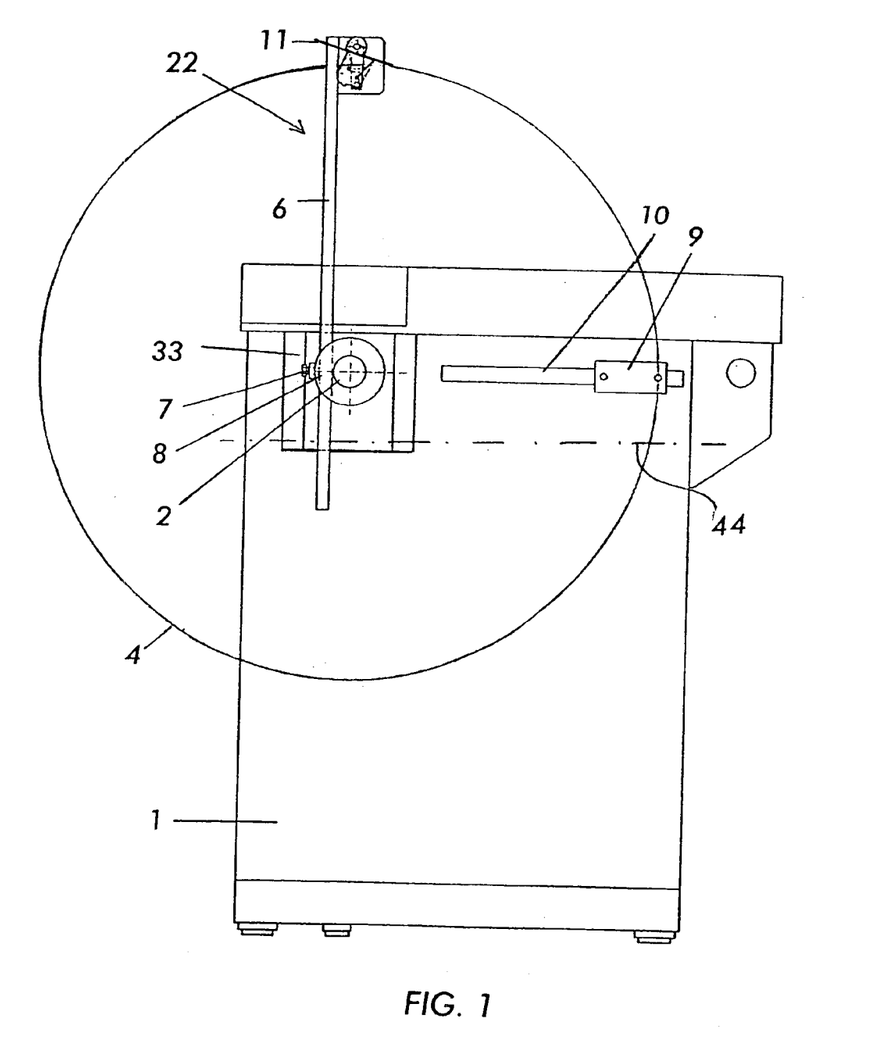
FIG. 1 shows a side view of one exemplary embodiment.
Figure 2:
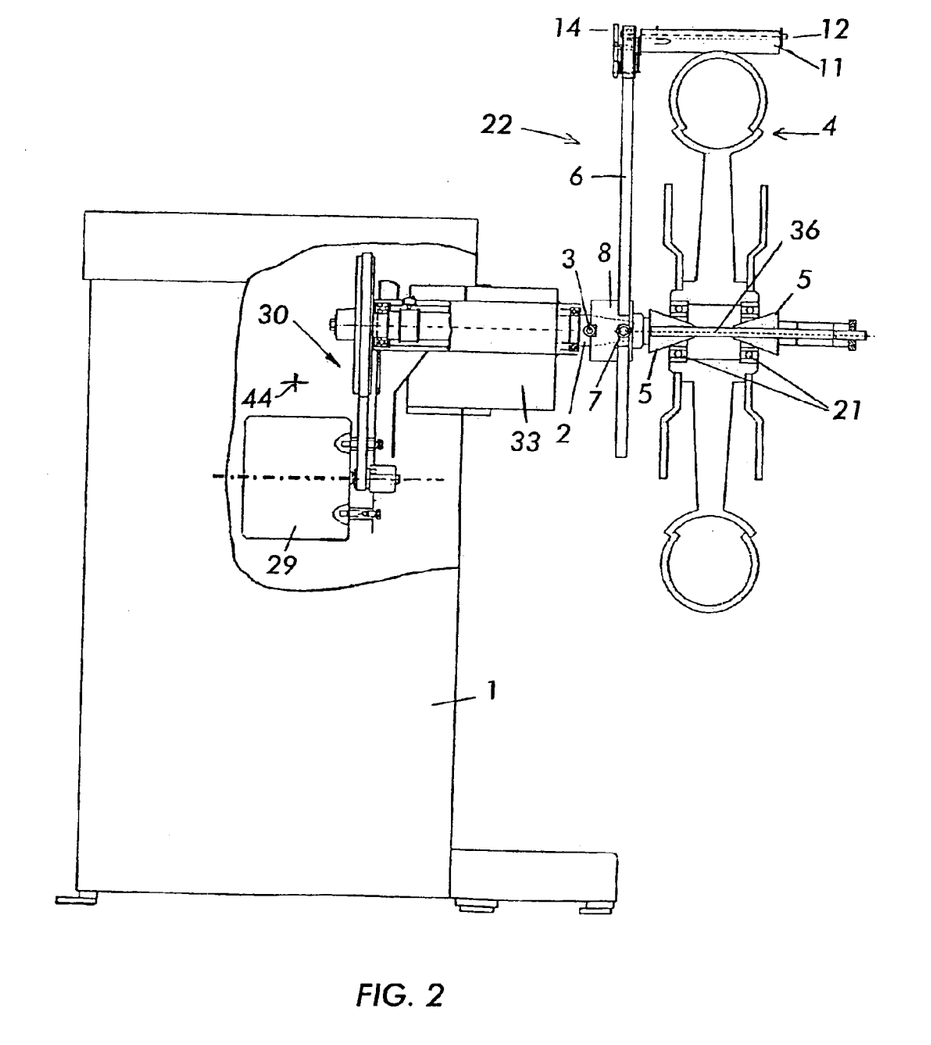
FIG. 2 shows a front view of the exemplary embodiment illustrated in FIG. 1, with the machine housing partially opened.
Figure 3:
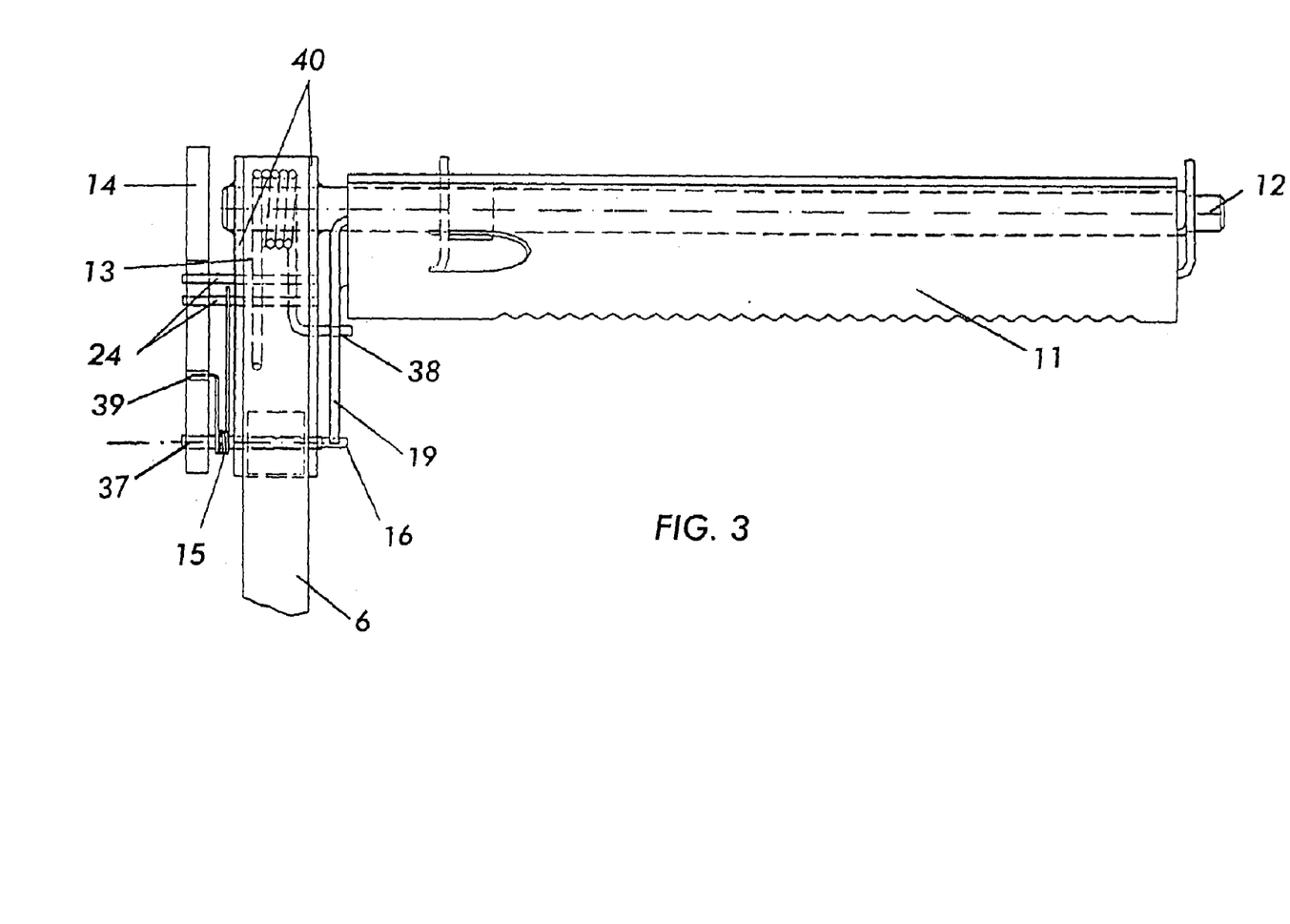
FIG. 3 shows an enlarged front view of a part of a driver device which is used in the exemplary embodiment.

In order to measure the unbalance of the motor cycle wheel 4, the driver device 22 has a clamping shaft 36 which is arranged coaxially with respect to the main shaft 2 and on which the motor cycle wheel 4 is mounted, in its own bearings 21, such that it can rotate (FIGS. 1 and 2). The driver device 22 has an attachment sleeve 8 (chuck) which is placed on the front, possibly conical, end of the main shaft 2. For this purpose, the attachment sleeve 8 has a conically shaped hole. The attachment sleeve 8 is connected in a rotationally fixed manner to the main shaft 2 by means of a detachable attachment means 3, in particular a driver screw. A driver arm 6 which can be moved in its longitudinal direction, that is to say radially with respect to the main shaft 2, is provided on the attachment sleeve 8. The effective length of the driver arm 6 can be adjusted as a function of the wheel diameter, and a driver bracket (11), which is provided on the driver arm 6, can be pressed with a specific driver force against the running surface of the wheel 4. A clamping device 7, in particular a clamping screw, firmly connects the attachment sleeve 8 to the driver arm, which extends essentially radially from the attachment sleeve 8.

In the illustrated exemplary embodiment, the clamping shaft 36 is connected in a rotationally fixed manner to the attachment sleeve 8. However, it is also possible to insert the clamping shaft 36 through a hole in the attachment sleeve 8 into a corresponding recess at the front end of the clamping shaft 2 in a rotationally fixed manner, for example by means of a screw connection. Conically running centering apparatuses 5 are provided on the clamping shaft 36 and ensure that the arrangement of motor cycle wheels 4 with different hub diameters and/or with different diameters of the wheel bearings 21, is centered on the clamping shaft 36.

At the free end of the driver arm 6, the driver device 22 has the driver bracket 11, which is mounted such that it can pivot about a pivoting journal 12 which extends essentially parallel to the main shaft 2 and to the clamping shaft 36. The pivoting journal 12 for the driver bracket 11 is attached at the free end of the driver arm 6 to a bearing device 40 which has two parallel bearing plates, as can be seen in particular from FIG. 3. As already explained, in order to connect the driver device 22 in a rotationally fixed manner to the motor cycle wheel 4, the driver bracket 11 is placed onto the running surface of the tire on the motor cycle wheel 4, as can be seen from FIGS. 1 and 2. This is achieved by appropriate adjustment of the effective length of the driver arm 6 and by connecting it in a fixed manner to the attachment sleeve 8 by tightening the clamping device 7. In this first position, as is shown in FIGS. 1 to 4, the torque which is produced by the electrical drive 20 is transmitted via the main shaft 2 and the driver device 22 to the motor cycle wheel 4. This allows the motor cycle wheel 4 to be accelerated to the measurement rotation speed in order to carry out an unbalanced measurement.

Figure 4:
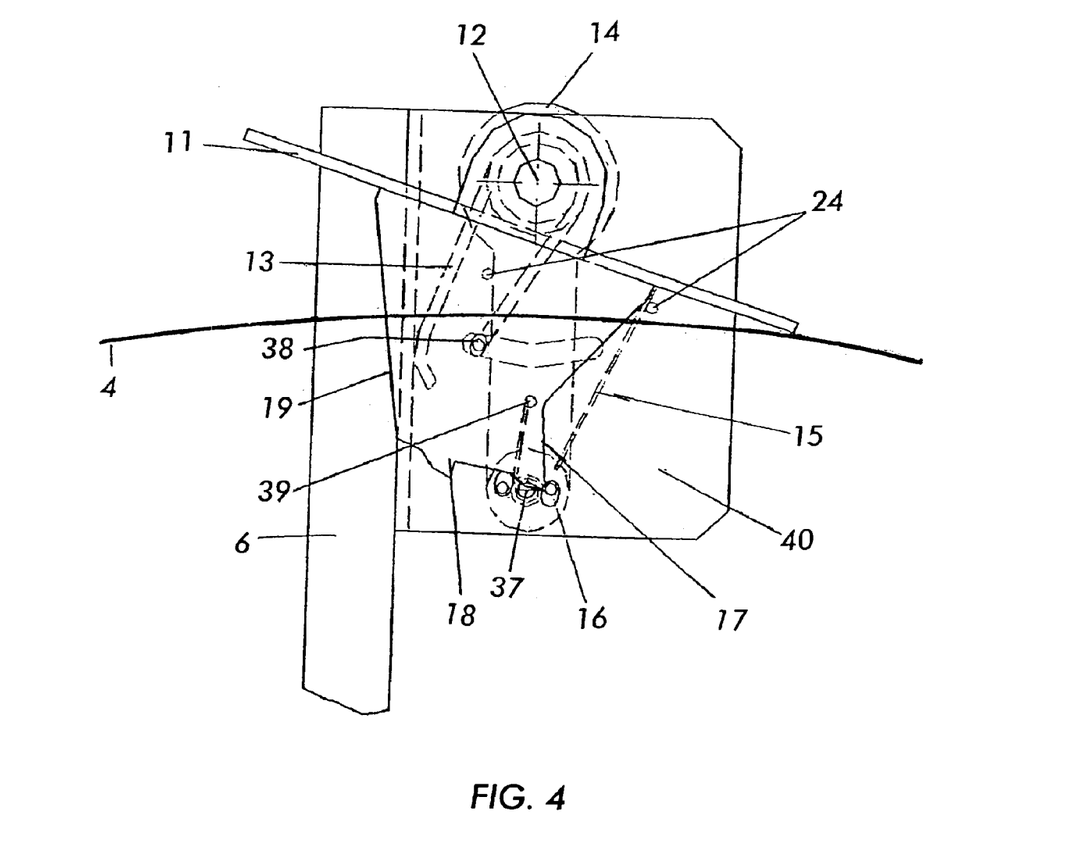
FIG. 4 shows a side view of that part of the driver device which is illustrated in FIG. 3, in a first position for transmitting a torque to a motor cycle wheel which is to be balanced, while the wheel is being accelerated to the measurement rotation speed.

The driver bracket 11 is held firmly in the pivoted position as illustrated in FIG. 4 in order to hold the driver bracket 11, which in the illustrated exemplary embodiment is in the form of a driver strip or driver plate, in the first position (driving position). A latching device is provided for this purpose, and includes a latching element 16 and a stop plate 19, which is firmly connected to the driver bracket 11. The stop plate 19 has two latching stops 17 (first latching stop) and 18 (second latching stop). In the position shown in FIG. 1, the latching element 16 is engaged with the first latching stop 17 on the stop plate 19. As can be seen from the figures, the stop plate 19 extends essentially in a plane at right angles to the pivoting journal 12.

The two latching elements 16, one of which (the right-hand latching element in FIGS. 4 to 7) engages with the two latching stops 17 and 18, are rigidly connected to an inert mass 14 which, in the illustrated exemplary embodiment, is in the form of a pendulum and is mounted, such that it can move about a pendulum journal 37, on the driver arm 6 and on the bearing device 40. This ensures that the inert mass 14 revolves together with the main shaft 2 when a torque is transmitted from the electrical drive 20 to the motor cycle wheel 4. The inert mass 14 may also be connected in a rotationally fixed manner to the main shaft 2 at some other suitable point and by other suitable means, so that it is possible to operate the latching device. The inert mass 14 of the pendulum is mounted such that it can move about the pendulum journal 37 against a restoring force which is produced by a restoring spring 15. When the torque produced by the electrical drive 20 is transmitted for acceleration to the measurement rotation speed, the inert mass 14 of the pendulum is pressed against a stop 24 (left-hand stop in FIGS. 4 to 7). This left-hand stop 24 is attached to the free end of the driver arm 6, preferably on the bearing device 40, which has the two parallel bearing plates. The restoring spring 15, which is in the form of a spring clip, is supported by its own spring end (spring limb) on a further limiting stop 24, which is attached to the bearing device 40. The second spring end (spring limb) of the restoring spring 15 acts at an action point 39 on the pendulum, which represents the inert mass 14.

Figure 5:
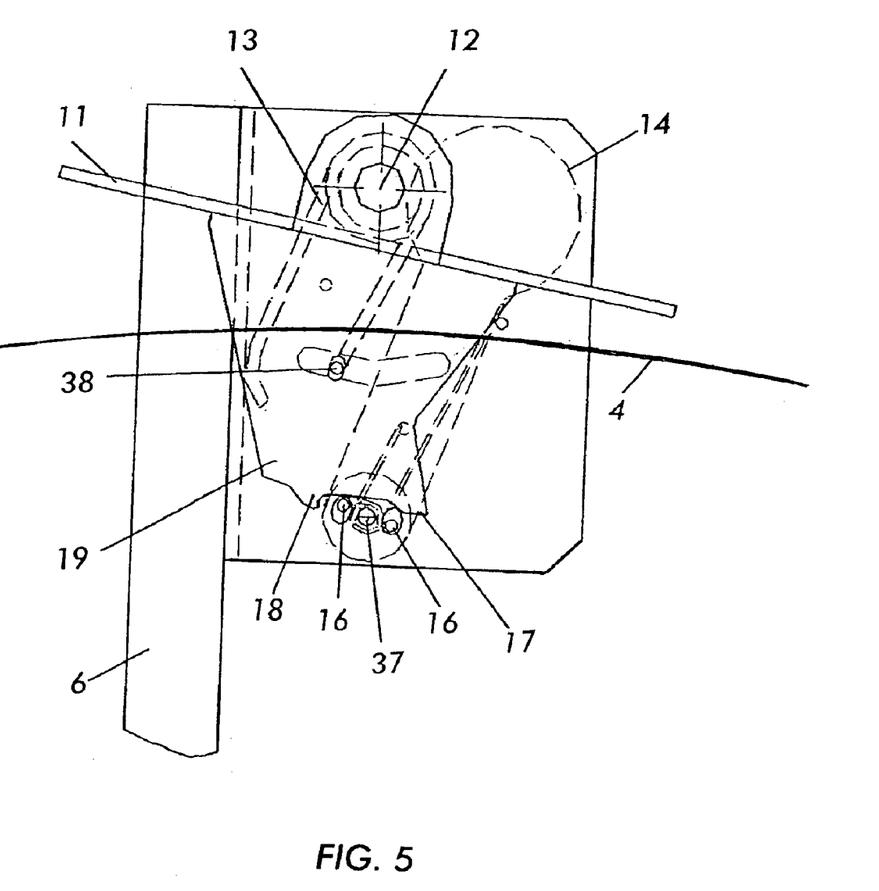
FIG. 5 shows the operating state in which the rotationally fixed connection between the motor cycle wheel and the driver device has been released.

When the motor cycle wheel 4 that is to be balanced has accelerated to the measurement rotation speed, the electrical drive produces a torque impulse, preferably by means of a brief change in the rotation speed, in particular an increase in the rotation speed, and this pivots the inert mass 14 of the pendulum against the restoring force of the spring in FIG. 4 from the left-hand limiting stop 24 in the clockwise direction about the pendulum journal 37 into the position illustrated in FIG. 5. This pivoting movement is preferably limited by the right-hand limiting stop 24. During this movement of the inert mass 14 from the position shown in FIG. 4 to the position shown in FIG. 5, the right-hand latching element 16 is detached from the first latching stop 17 by pivoting about the pendulum journal 37.

In the process, the spring force which is produced by a driver spring 13 pivots the driver bracket 11 in the counter-clockwise direction from the first position, as is illustrated in FIG. 4, about the pivoting journal 12 and releases it from the running surface of the motor cycle wheel 4, as is illustrated in FIG. 5. In the illustrated exemplary embodiment, the driver spring 13 is likewise in the form of a spring clip. One spring end (the left-hand spring limb) is supported on the driver arm 6. The right-hand spring end (right-hand spring limb) engages on the driver bracket 11 at a point of action 38, which is provided on the stop plate 19. Since the restoring spring 15 is prestressed in the first position, as illustrated in FIG. 4, and thus forms a force store, this prestressing force is released when the latching engagement between the latching element 16 and the latching arm stop 17 is released so that, as already explained, the driver bracket 11 is pivoted in the counterclockwise direction into the intermediate position, as is illustrated in FIG. 5, in which the driver bracket 11 is released from the motor cycle wheel 4. This pivoting movement continues until the right-hand latching element 16 strikes the second latching stop 18 (FIG. 6).

In the process, the right-hand latching element 16 is moved to its upper position, which is located in the pivoting area of the second latching stop 18. This is achieved by the inert mass 14 of the pendulum being moved back about the pendulum journal 37 in the clockwise direction to its original position once again, by the restoring force of the restoring spring 15. This movement of the inert mass back to the original position is assisted by an impulse being exerted via a stop edge on the stop plate 19 during the pivoting of the driver bracket 11 in the counterclockwise direction onto the left-hand latching element 16 (which is provided on the pendulum of the inert mass 14) in FIG. 5, with this impulse pivoting the pendulum back to the original position in the counterclockwise direction (FIG. 6). In this case, the pendulum of the inert mass 14 once again rests on the left-hand limiting stop 24.

Figure 6:
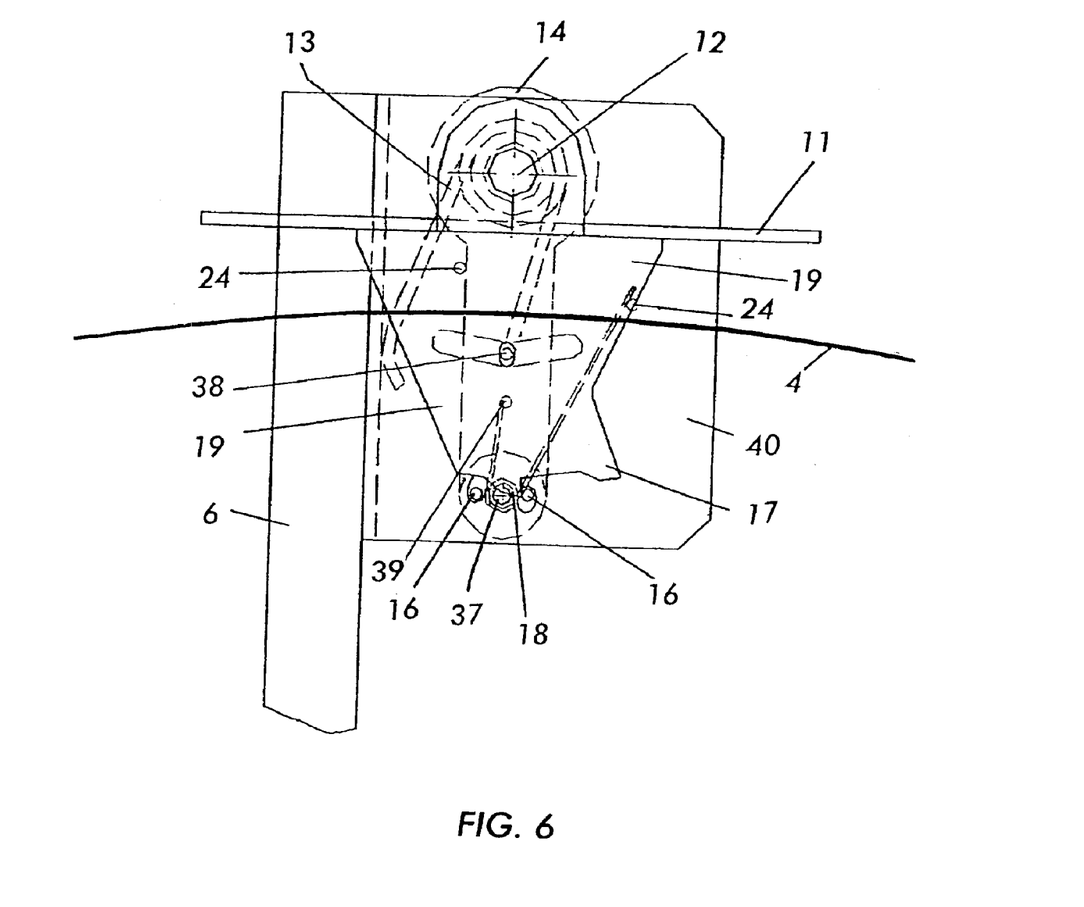
FIG. 6 shows a second position, in which that part of the driver device which is illustrated in FIGS. 3 to 5 is held in the latched state, released from the motor cycle wheel.
Figure 7:
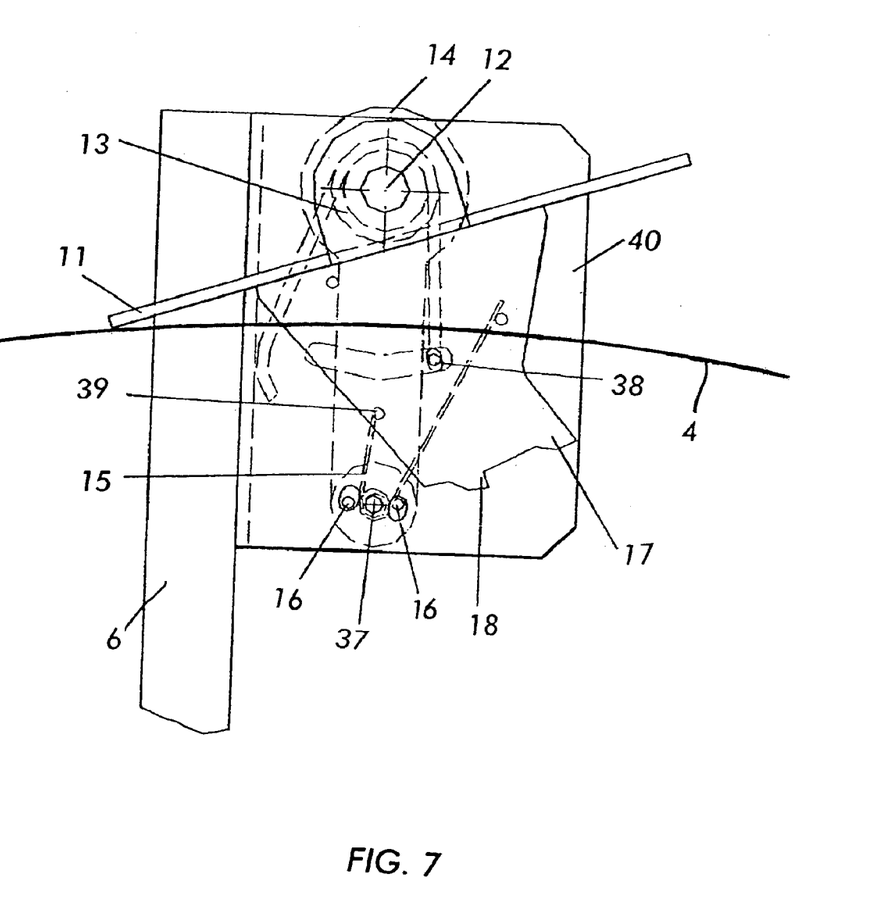
FIG. 7 shows a third position of the driver part illustrated in FIGS. 3 to 6, in which the driver device is connected in the rotationally fixed manner to the motor cycle wheel during braking after the measurement run.

In the latched-in second position, as is illustrated in FIG. 6, the driver bracket 11 is held in the state where it is released from the motor cycle wheel 4, at least during the measurement run during which the unbalance measurement on the motor cycle wheel 4 is carried out. During this process, the motor cycle wheel 4 rotates freely and without any external influences in its bearings 21 on the clamping shaft 36. During the measurement run, the rotary movement of the main shaft 2 is stopped. The weight of the driver bracket 11 moves it to the 6 o'clock position, where it remains for as long as the measurement run is being carried out, released from the running surface of the motor cycle wheel, as is illustrated in FIG. 6.

During this measurement run, the rotary movement of the motor cycle wheel 4 is detected by a scanning or sampling device 9 which is arranged on the outside of the machine housing 1 (FIG. 1). In this case, by way of example, a marking which is applied to the motor cycle wheel can be scanned or sampled optically by the scanning or sampling device 9. A number of markings or parts of the motor cycle wheel may also be scanned or sampled. The scanning or sampling device 9 may be set, in a rail 10, to the circumferential radius of the marking or of the points being scanned or sampled. Measurement transducers of a measurement device 23, which, as already explained, can be integrated in the bearing device 33 for the main shaft 2, are used to measure forces which result from the wheel unbalance, and these are passed by means of the signals from the scanning or sampling device 9, as an angle-dependent function, to the machine electronics 41. The machine electronics 41 include a computer which uses the received signals to calculate unbalance compensation parameters in the known manner (FIG. 8). If the measurement device 23 is arranged as illustrated in FIG. 8, the measurement transducers are arranged at an axial distance from one another on the main shaft 2. However, it is also possible to use a measurement arrangement as is known from DE 198 44 975 C2.

Once the measurement run has been carried out, the motor cycle wheel 4 can be brought to rest by means of a suitable braking device, which is not illustrated, and can be moved to the unbalance compensation rotation angle position.

In the illustrated exemplary embodiment, once the unbalance measurement run has been carried out, the motor cycle wheel 4 is preferably braked by the electrical drive device 20. This is done by switching the electrical drive device 20 on once again, and accelerating the main shaft 2 and the driver device 22, which is thus connected to it in a rotationally fixed manner, to the current rotation speed of the motor cycle wheel 4 as it slows down. The appropriate rotation speed can be determined by means of the scanning or sampling device 9 and by appropriate evaluation of the scanning or sampling signals in the machine electronics 41. As soon as the main shaft 2 and the driver device 22 which rotates with it have reached the current rotation speed of the motor cycle wheel 4, the electrical drive 20, under the control of the machine electronics 41, produces a brief torque change, and thus a further torque impulse, by means of which the inert mass 14 is pivoted about the pendulum journal 37 in the clockwise direction from its left-hand original position as illustrated in FIG. 6. The pivoting movement may take place as far as the right-hand limiting stop 24, as is illustrated in FIG. 5. In the process, the right-hand latching element 16 is disengaged from the second latching stop 18, so that the driver bracket 11 is pivoted out of the position illustrated in FIG. 6, in the counterclockwise direction, about the pivoting journal 12 into the position illustrated in FIG. 7. This pivoting movement is produced by the force of the driver spring 13. In the position illustrated in FIG. 7, the other longitudinal edge of the driver bracket 11 is pressed against the running surface of the motor cycle wheel 4. This produces a rotationally fixed connection between the motor cycle wheel 4 and the main shaft 2 via the driver device 22. The electrical drive produces a torque (braking torque) which reduces the rotation speed of the motor cycle wheel, so that the motor cycle wheel is brought to rest. The motor cycle wheel is preferably stopped in the compensation position, in which the necessary unbalance compensation can be carried out conveniently.

The driver force is of such a magnitude that the driving and braking torque produced by the electrical drive 20 is transmitted to the motor cycle wheel 4 without any slip. This ensures that the wheel is stopped at the desired compensation angle position for unbalance compensation.

FIG. 8 shows a suitable electrical drive 20 with a suitable power supply circuit 26. This electrical drive and the associated power supply circuit 26 make it possible to produce not only the torque that is required for acceleration to the measurement rotation speed and the torque which is required for braking, but also to produce the torque impulses which are required to move the driver bracket 11 to the appropriate positions.

In order to control the power supply, the power supply circuit 26 has an AC voltage controller, which is controlled by pulse-width modulation (PWM) 25, with a series switch S1 and a commutation switch S2, via which stator windings 27, 28 of an electric motor 29, which forms the essential part of the electrical drive 20, are supplied with electrical power. The rotation direction of the electric motor 29 is set by means of a changeover switch K1, which is preferably in the form of a relay. By way of example, the figure shows the changeover switch K1 in the switching position for the forward rotation direction, in which the motor vehicle wheel 35 or the motor cycle wheel 4 is accelerated to the measurement rotation speed. A capacitance in the auxiliary path, which is connected in series with the stator winding 27 in FIG. 8, allows the two stator windings 27, 28 to be supplied with the motor current with a phase difference of, in particular, 90°. The motor current is supplied from an AC voltage source Ue. Instead of a capacitor, two or more capacitors C1, C2 may be used in order to vary the capacitance in the auxiliary path, and may be connected into the motor circuit or disconnected from it as a function of the desired rotation speed, as is described by way of example in DE 100 00 235 A1. In the illustrated exemplary embodiment, the capacitor can be connected or disconnected by means of a switch 43. When the switch is closed, the two capacitors C1 and C2 are connected in parallel in the same way as for a double-capacitor motor.

The switch 43 is controlled by the machine electronics 41.

Both the series switch S1 and the commutation switch S2 comprise two back-to-back series-connected semiconductor switches. These semiconductor switches are preferably in the form of IGBTs. However, MOSFETs may also be used. The power semiconductor switches have an integrated back-to-back parallel-connected diode so that, if the polarity of the respective semiconductor switch becomes negative, this diode carries current and no electrical voltage can be produced. Since the semiconductor switches have to block AC voltage or have to carry alternating current during operation of the AC voltage controller and the semiconductor switches can block or pass on voltage of only one polarity, two semiconductor switches are in each case provided, in a back-to-back series-connected circuit, both for the series switch S1 and for the commutation switch S2.

When the changeover switch K1 is in the switch position illustrated in FIG. 8, the series switch S1 passes on the AC voltage from the AC voltage source Ue, for example the mains voltage, to the electric motor 1. The commutation switch S2 is driven by the pulse-width modulation (PWM) 25 such that it carries the current for the motor inductance for as long as the series switch S1 is switched off (synchronous commutation). To do this, the two gates of the semiconductor switches which form the series switch S1, for example the two IGBTs, are driven in the opposite sense to the two gates of the semiconductor switches which form the commutation switch S2. This ensures that the control voltages which are applied by the pulse-width modulation 25 to the gates of the series switch S1 and of the commutation switch S2 are not supplied at the same time, but on an alternate cycle or in the opposite sense. The magnitude of the motor current which is supplied to the stator windings 27, 28 is governed by the duty ratio of the PWM signal. The clock frequency of the PWM signal is preferably modulated in the order of magnitude of between 3 and 10 kHz.

In order to stop the wheel 4 or 35 at a specific position, for example the compensation rotation angle position, after the measurement run, the electric motor 29 produces an opposing torque. This is done by switching the changeover switch K1 to an appropriate switch position, for example the switch position located at the top in FIG. 8, as a function of the respective rotation direction of the motor vehicle wheel 4 or 35. In this switch position, the capacitors C1 and C2 are connected in series with the stator winding 28, when the switch 43 is closed. During this motor braking mode, the switch S2 acts as the series switch and the switch S1 acts as the commutation switch. As during acceleration, the stator windings 27, 28 are supplied with alternating current via the AC voltage controller. In this case, an opposing torque is produced, and this is used to brake the rotation of the motor vehicle wheel 4 or 35 and of the main shaft 2. The braking process can be controlled by the operation of the pulse-width modulation 25 in such a manner that the motor vehicle wheel 4 or 35 is stopped at the desired compensation rotation angle position. It is also possible to define the time at which the switch K1 is switched to the motor braking mode such that, with the torque that is produced by the electric motor 29 creating a known braking effect, the rotor is stopped at the compensation rotating angle position, as a function of the current rotation speed.

The machine electronics 41 are provided in order to control the changeover switch K1 and the pulse-width modulation 25 and, depending on the nature of the wheel type to be balanced, is connected to the scanning or sampling device 9 or a scanning or sampling device 34 which scans or samples the rotation of the main shaft 2 and which scans or samples the respective rotation angle position of the main shaft 2, and hence of the motor vehicle wheel and/or the rotation speed as well as the rotation direction.

During the process of balancing the motor cycle wheel 4, the torque which is supplied from the electrical drive 20 during acceleration to the measurement rotation speed and the torque which is used for braking the main shaft 2 after the measurement run can be reduced to such an extent that a reduced driver force can be used for the rotationally fixed connection of the motor cycle wheel 4 to the main shaft 2. This driver force can be reduced sufficiently to avoid the displacement (which would corrupt the unbalance measurement) of the center point of the motor cycle wheel 4 with respect to the axis of the main shaft 2 during acceleration and during braking.

In the illustrated exemplary embodiment, an input device 42 is provided for the respective wheel type that is clamped onto the main shaft 2. This is used to control the drive system, in particular the power supply circuit 26 for the electric motor 29 in order to produce the appropriate supply current, and hence the appropriate torque. According to the illustrated exemplary embodiment, the machine electronics 41, to which the wheel type input information is passed, are used to set the pulse-width modulation 25 for an AC voltage controller (S1, S2). Furthermore, the capacitor C2 may be opened, additionally or on its own, by opening the switch 43, which is driven by the machine electronics 41, during acceleration and/or during braking. If a number of capacitors are provided, one or more of these capacitors may be disconnected. This results in the appropriate torque setting as a function of the type of wheel on the main shaft 2. The drive apparatus illustrated in the figure advantageously not only accelerates the motor cycle wheel 4 to the measurement rotation speed but also brakes it after the measurement run. As already explained, the changeover switch K1 is moved to the appropriate position for this purpose.

The torque can also be reduced or influenced during acceleration to the measurement rotation speed and during braking after the measurement run by means of the apparatus as described in DE 100 00 235 A1, with the control device which is used to adjust the torque being operated as a function of the wheel type input during acceleration, and in an appropriate manner during braking.

A belt drive, as is illustrated in FIG. 2, may be used as the transmission 30 that is used to transmit the torque produced by the electrical drive to the main shaft. The pulley disk, which is seated on the shaft of the electric motor 29, has a smaller diameter than the pulley disk which is seated on the main shaft 2. Instead of the belt drive, a gearwheel transmission may be used, comprising two gearwheels 31 and 32 (FIG. 8). The two gearwheels preferably have a helical tooth system. Since the electric motor 29 is in the form of an asynchronous motor, in particular a single-phase asynchronous motor with an auxiliary winding, the motor continuously emits a forward-driving torque via the gearwheel transmission to the main shaft 2.

In both exemplary embodiments, the electric motor 29 is located underneath the plane in which the main shaft 2 is arranged. The bearing device 33 of the main shaft (in which the measurement transducers of the measurement device 23 are also integrated, preferably in the arrangement described in German Patent Specification 198 44 975 C2) is preferably mounted as a standard physical unit together with the electric motor 29 on the machine housing 1, such that it can pivot about a pivoting journal 44. In this case, the main shaft 2 can be moved to a vertical position from a horizontal position as shown in FIGS. 1 and 2.

What is claimed is:

1. A method for measuring an imbalance of a motor vehicle wheel, comprising the steps of:
   accelerating the motor vehicle wheel to the measurement rotation speed by a torque which is produced by an electrical drive and is transmitted from a main shaft to the motor vehicle wheel via a torque-transmitting connection,
   measuring forces which result from the imbalance at the measurement rotation speed, and
   braking the motor vehicle wheel after the measurement,
   wherein, when the measurement rotation speed is reached, the connection between the motor vehicle wheel and the main shaft is detached by an inertial force which is produced by a torque impulse.

2. The method as claimed in claim 1,
   wherein, in order to brake the motor vehicle wheel, the previously detached main shaft and motor vehicle wheel are connected once again by an inertial force which is produced by a further torque impulse.

3. The method as claimed in claim 2,
   wherein, before once again connecting the motor cycle wheel and the main shaft, the main shaft is driven to reach approximately the same rotation speed as the rotating motor cycle wheel.

4. The method as claimed in claim 1 or claim 2,
   wherein the inertial force is formed by an inertial mass which is rotated by the main shaft and on which the torque impulse or the further torque impulse which is produced by the electrical drive acts.

5. An apparatus for measurement of an imbalance of a motor cycle wheel, comprising:
   a rotatable main shaft of a wheel balancing machine, driven by an electrical drive,
   a clamping shaft fixed to the balancing machine coaxially with respect to the main shaft and on which the motor cycle wheel can be rotatably mounted by its bearings,
   a driver device which is connected to the main shaft and engageable with the motor cycle wheel in order to transmit a torque, produced by the electrical drive, from the main shaft to the motor cycle wheel, and
   a measurement device which, in one measurement run, measures forces which result from any imbalance of the motor cycle wheel at the measurement rotation speed,
   wherein the torque-transmitting connection between the main shaft and the motor cycle wheel via the driver device can be detached by an inertial force which acts on the driver device and is formed by a torque impulse that is transmitted via the main shaft.

6. The apparatus as claimed in claim 5,
   wherein the torque impulse is produced at the measurement rotation speed.

7. The apparatus as claimed in claim 5,
   wherein, after the measurement run, the driver device is operated by an inertial force, which is produced by a further torque impulse, in order to brake the motor cycle wheel.

8. The apparatus as claimed in one of claims 5 and 7, further comprising
an inertial mass which is rotated with the main shaft and is mounted movably on the driver device, and on which the torque impulse acts.

9. The apparatus as claimed in claim 8,
wherein the inertial mass is mounted such that it can move in one direction.

10. The apparatus as claimed in claim 8,
wherein the inertial mass is mounted such that it can move against a restoring force.

11. The apparatus as claimed in claim 8,
wherein the inertial mass is mounted such that it can move in one of two rotation directions of the main shaft.

12. The apparatus as claimed in claim 8,
wherein the inertia mass is a pendulum.

13. The apparatus as claimed in claim 8,
wherein the movement distance of the inertial mass is limited.

14. The apparatus as claimed in claim 13,
wherein at least one stop is provided on the driver device in order to limit the movement distance of the inertial mass.

15. The apparatus as claimed in claim 5,
wherein the torque impulse is produced by the electrical drive.

16. The apparatus as claimed in claim 5,
wherein, in order to achieve the torque-transmitting connection between the main shaft and the motor cycle wheel, the driver device acts on the motor cycle wheel with a specific driver force.

17. The apparatus as claimed in claim 16,
wherein the driver force is transmitted a driver spring.

18. The apparatus as claimed in claim 16,
wherein the torque which is produced by the electrical drive can be adjusted as a function of the driver force during acceleration to the measurement rotation speed and/or during braking.

19. The apparatus as claimed in claim 5,
characterized in that the driver device has a driver bracket which can be pressed with the driver force against the tire running surface of the motor cycle wheel.

20. The apparatus as claimed in claim 19,
wherein the driver bracket can pivot about a pivoting journal which runs essentially parallel to the main shaft.

21. The apparatus as claimed in claim 19,
wherein the driver bracket can pivot to three positions about a pivoting journal which runs essentially parallel to the main shaft, with a first position being assumed during acceleration to the measurement rotation speed, a second position being assumed when the torque-transmitting connection between the driver device and the motor cycle wheel is released, and a third position being assumed during braking of the motor cycle wheel.

22. The apparatus as claimed in claim 21,
wherein, while changing between the successive three positions, the driver bracket is pivoted in one direction about the pivoting journal.

23. The apparatus as claimed in claim 21,
wherein the driver bracket is fixed in at least the first position and in the second position by means of a latching device which is operated by the inertial mass.

24. The apparatus as claimed in claim 23,
wherein the latching device is formed by at least one latching element, which is operated by the inertial mass, and latching stops, which are attached to the driver bracket and with which the at least one latching element engages.

25. The apparatus as claimed in claim 21,
wherein the driver bracket can be moved by spring force of a driver spring, successively from the first position to the third position.

26. The apparatus as claimed in claim 5,
wherein the driver device and the clamping shaft are connected to one another in a torque-transmitting manner.

27. The apparatus as claimed in claim 26,
wherein the torque-transmitting connection between the driver device and the main shaft is detachable.

28. The apparatus as claimed in claim 5,
wherein the electrical drive for the main shaft is switched off when the engagement between the driver device and the motor cycle wheel is detached.

29. The apparatus as claimed in claim 5,
wherein a scanning or sampling device, which scans or samples the rotary movement of the motor cycle wheel, is arranged on the balancing machine.

30. The apparatus as claimed in claim 29,
characterized in that the scanning or sampling device scans or samples a marking which is arranged on the motor cycle wheel.

31. The apparatus as claimed in claim 5,
further comprising a power supply circuit having an AC voltage controller, which is controlled by pulse-width modulation, in order to supply power to the electrical drive, which is a single-phase AC motor.

32. The apparatus as claimed in claim 31,
wherein the AC voltage controller has a series switch and a commutation switch, which are controlled by the pulse-width modulation.

33. The apparatus as claimed in claim 32,
wherein the series switch and the commutation switch are each formed by two back-to-back series-connected semiconductor switches.

34. The apparatus as claimed in claim 33,
wherein the semiconductor switches are MOSFETs or IGBTs.

35. The apparatus as claimed in claim 31,
wherein the single-phase AC motor has two stator windings and at least one capacitor, which is connected in series with one of the two stator windings depending on the rotation direction, for a phase-shifted power supply.

36. The apparatus as claimed in claim 35,
wherein the at least one capacitor can be connected in series with one of the two stator windings by a changeover switch.

37. The apparatus as claimed in claim 31,
wherein the motor cycle wheel is connected via the driver device to the main shaft by a driver force which avoids displacement of the wheel center point, and the power supply circuit is set such that the torque-transmitting connection between the motor cycle wheel and the main shaft is maintained at the torque which is supplied by the electric motor during acceleration to the measurement rotation speed and during braking.

38. The apparatus as claimed in claim 5,
wherein the electrical drive is arranged in the balancing machine underneath a plane in which the main shaft lies.

39. The apparatus as claimed in claim 5, further comprising:
a bearing device mounted together with the electrical drive on the balancing machine such that said bearing device can pivot in order to provide a rotatable bearing for the main shaft, in which a measurement device which has measurement transducers is integrated.

40. The apparatus as claimed in claim 5, further comprising:
a transmission provided between the electrical drive and the main shaft by which torque which is produced by the electrical drive can be transmitted to the main shaft,
wherein the transmission is a gearwheel transmission disposed between the electrical drive and the main shaft.

41. The apparatus as claimed in claim 40,
wherein the gearwheel transmission has two gearwheels.

42. The apparatus as claimed in claim 41,
wherein the gearwheels of the gearwheel transmission have a helical tooth system.

* * * * *